(12) United States Patent
Hoffmann

(10) Patent No.: US 6,198,043 B1
(45) Date of Patent: Mar. 6, 2001

(54) CLAMP FOR A CABLE DUCT

(75) Inventor: Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/310,869

(22) Filed: May 12, 1999

(30) Foreign Application Priority Data

May 12, 1998 (DE) ............................................. 198 21 069

(51) Int. Cl.⁷ ..................................................... H02G 3/64
(52) U.S. Cl. ............................. 174/48; 174/68.3; 174/95; 174/97
(58) Field of Search ................................... 174/48, 65, 50, 174/49, 97, 68.3, 101, 95, 68.1, 100; 52/220.5; 361/644, 645, 675; 220/3.3, 3.9, 3.8, 241; 138/162

(56) References Cited

U.S. PATENT DOCUMENTS

| | | | |
|---|---|---|---|
| 4,953,735 | * 9/1990 | Tisbo et al. ............................. | 220/6 |
| 5,614,695 | * 3/1997 | Navazo ................................... | 174/48 |
| 5,629,496 | * 5/1997 | Navazo ................................... | 174/48 |
| 5,728,976 | * 3/1998 | Santucci et al. ....................... | 174/135 |
| 5,949,025 | * 9/1999 | Nagai et al. ........................... | 174/101 |
| 6,005,187 | * 12/1999 | Navazo ................................... | 174/48 |

FOREIGN PATENT DOCUMENTS

| | | | |
|---|---|---|---|
| 0271891 | 6/1988 | (EP) . | |
| 0348285 | * 12/1989 | (EP) ................................... | 174/68.3 |
| 0862253 | 9/1996 | (EP) . | |
| 1404973 | 5/1965 | (FR) . | |

* cited by examiner

*Primary Examiner*—Kristine Kincaid
*Assistant Examiner*—Dhiru R Patel
(74) *Attorney, Agent, or Firm*—Brown & Wood, LLP

(57) ABSTRACT

A clamp for a cable duct having, at its open side (23), in regions of the free ends (24) of the side walls, inward projecting, strip-shaped edges, with the clamp including connection portions (3) provided at opposite longitudinal ends (5) of the bridge section (2) of the clamp, which bridges the open side (23) of the cable duct (20) being formed as inwardly bent, facing each other hooks lockingly engageable in undercuts (29) provided in respective anchoring grooves (28) extending in a longitudinal direction of the cable duct (20) and limited by respective bent-out portions (27) of respective side wall edges (26) and respective side walls (22).

10 Claims, 3 Drawing Sheets

CLAMP FOR A CABLE DUCT

BACKGROUND OF THE INVENTION

1. Field of the Invention

The present invention relates to a clamp for a cable duct that has, at its open side, in regions of free ends of its side walls, inward projecting strip-shaped edges with the clamp including a bridge section for bridging the open side of the cable duct, and connection portions provided at opposite longitudinal ends of the bridge section for engaging the strip-shaped edges.

2. Description of the Prior Art

Cable ducts mentioned above serve generally for receiving electrical cables and conductors. They can be mounted in indentations formed in walls, ceilings, or floors. Often, they are mounted on outer surfaces of walls. Often used cable ducts have a substantially U-shaped cross-section and have a bottom wall from which two side walls extend primarily at an approximately right angle. A side of the cable duct opposite the bottom wall remains open to provide for insertion of cables. Also known are so-called angular ducts which are formed for mounting in a corner formed by two butt-joined walls. The angular ducts have essentially a triangular cross-section which is formed of a bottom wall and two side walls projecting from the bottom wall and forming an obtuse angle or is formed of two side walls connected with each other along their longitudinal sides.

Conventional cable ducts are closed with covers after cables have been placed into the ducts. The covers lockingly engage in undercuts formed in outer sides of the side walls at their free ends. The inserted cable loads the side walls pushing them outwardly. This can cause difficulties during mounting and securing of the cover. To provide for a greater stability of the side walls, which are loaded by inserted cables, there are provided clamps which bridge the open side of the cable duct and are secured on strip-shaped edges which project inward from inner surfaces of the side walls in the regions of the free ends of the side walls and which extend in a longitudinal direction of the cable duct. German Utility Model DE-U-79 31 274 discloses a clamp for a cable duct which is secured in elongate slots formed in the strip-shaped edges of the side walls. To this end, the clamp has, at its opposite longitudinal ends, respectively, two locking fingers with hooks, which are separated by a slot. The locking fingers are pressed together by a force acting transverse to the longitudinal extent of the clamp. Thereby, the width of the clamp, in the region of the hooks, is reduced, and the locking fingers can be inserted in the slot. A locking member inserted into the slot between the locking fingers, which can be removed, if necessary, prevents an accidental disengagement of the clamp from the edges of the side walls.

The clamp described above can only be secured in slots provided in respective edges and which are spaced by a predetermined distance. Mounting of the clamp in any arbitrary location of the cable duct, e.g., in the region of a duct or cover junction, is not possible. The release of the mounted clamp, e.g., for insertion of another cable, is very cumbersome. In order to press the locking finger toward each other, first, the locking member need be removed from the slot between the two fingers. To effect this, the use of both hands is necessary and, sometimes, the use of an auxiliary tool, e.g., a screwdriver or the like is required for removing the locking member.

German Utility Model DE-U-295 15 365 discloses a clamp having, at its longitudinal ends, somewhat U-shaped clamping sections. The strip-shaped edges, which project inward from the free ends of the side walls, are provided with longitudinal flutes at least on their upper surfaces. Together with correspondingly formed inner surfaces of the clamping sections of the clamp, they form a fluted locking connection. The advantage of this clamp consists in that it can be longitudinally displaced, if necessary, and can be mounted at any arbitrary location on the wall edges of the cable duct. The mounting of the clamp is rather easy. However, the clamp dismounting, e.g., in order to insert a new cable, requires the use of both hands for releasing the fluted connection.

Accordingly, an object of the present invention is a clamp for a cable duct which can be easily mounted at any arbitrary location along the cable duct. Another object of the present invention is a clamp for a cable duct which, after being mounted, can be easily displaced to a desired position, if needed. A further object of the invention is a clamp for a cable duct which will prevent a cable inserted into the duct from falling out. A still further object of the present invention is a clamp for a cable duct which will insure that it could not be accidentally released, in particular, with the closed cover. A yet further object of the present invention is a clamp for a cable duct which can be released with one hand, at least at one of its side, for insertion of another cable. Also, an object of the present invention is a clamp for a cable duct which will insure an adequate stiffness of the side walls so that the cover can be mounted with an adequate clamping force.

SUMMARY OF THE INVENTION

These and other objects of the present invention, which will become apparent hereinafter, are achieved by providing a clamp for a cable duct having, at its open side, in regions of free ends of its side walls, inward projecting, strip-shaped edges. The clamp includes a bridge section for bridging the open side of the cable duct, the opposite longitudinal ends of which are provided with connection portions for engaging the strip-shaped edges. The connection portions are formed as inwardly bent, facing each other hooks lockingly engageable in undercuts provided in respective anchoring grooves formed at the free ends of the side wall, extending in a longitudinal direction of the cable duct and limited by respective bent-out portions of respective edges of the side walls and respective side walls.

The clamp according to the present invention can be mounted at any arbitrary location along the wall edges and can be pushed, if necessary along the edges. The hook-shaped connection portion can be easily inserted into anchoring grooves provided with undercuts and can be hooked in the undercuts which extend in the longitudinal direction of the cable duct. Upon being loaded, e.g. by weight of the cable upon mounting of the cover, the locking engagement is further enhanced. This increases the holding force of the clamp and prevents an accidental disengagement of the clamp from the cable duct.

The locking connection, which is formed by engagement of the hook-shaped connection portions of the clamp in the undercuts of the anchoring grooves, on the other hand, is easily released, if needed, by grasping the clamp at one end and pulling it out of a respective anchoring groove. When the clamp is lifted in this manner for insertion of another cable in the cable duct, the respective hook-shaped connection portion can be easily reintroduced into the undercut of the respective anchoring groove. The longitudinal ends of the clamp are supported against the inner surfaces of the side walls of the cable duct. The hooked connection becomes latched in the undercut of the opposite groove and forms a type of a hinge which permits the clamp to be pulled upward at one end while the opposite ends remains connected with the associated edge. The mounted clamp provides for stiffening of the side walls and insures a correct spacing of the side walls from each other. This insures mounting of the cover on the cable duct with a necessary clamping force.

It is advantageous for the holding force of the clamp when a distance of a hook stop of the hook-shaped connection portion from an associated longitudinal end of the clamp measured transverse to the longitudinal extent of the cable duct is larger than a width of the respective anchoring groove at its mouth. The selected geometrical relationship insures that the longitudinal edges of the clamp are pressed against sections of the side walls, which extend above the wall edges forming the cable duct opening. As a result of the preload, which results from the pressing of the clamp edges against the side wall sections, the hook-shaped connection portions further penetrate into the undercuts of the anchoring grooves formed in the bent-out edge portions of the side wall edges.

For increasing the holding force of a clamp mounted on the side wall edges, the clamp-forming bridge section has at least one, manually actuable locking element. The locking element includes a latch, which can be bent outwardly transverse to the longitudinal extend of the cable duct and which includes a locking hook that, in the locking position, of the clamp, lockingly engages a locking nose formed on the inwardly facing side of the bent-out portion of the respective edge of the side wall. Because an additional securing means is provided for the clamp, the clamping force, with which the connection portions of the bridge section are retained on the side wall edges, can be reduced. The connection of the connection portions with the side wall edges serves for pre-mounting of the clamp on the cable duct. The clamp is mounted from above, with the hook-shaped connection portions engaging in the anchoring grooves. The pre-mounted clamp, if needed, can be easily pushed along the strip-shaped edges with a relatively small force. However, the holding force of the locking mechanism is sufficiently large to prevent the disengagement of the clamp from the side wall edges under the weight of the cable, which is inserted in the duct, at the overhead mounting. In spite of this, the clamp can be easily released at one of its side, if necessary, to provide for insertion of another cable into the cable duct. The locking elements insure fixing of the clamp on the side wall edges. The use of the locking elements increases the holding force of the clamp, preventing an accidental displacement of the clamp along the side wall edges.

Based on the manufacturing considerations and for insuring an easy handling, the bridge section is formed as a frame with two locking elements including each a locking arm, which is elastically and springy connected to the middle portion of the frame and which extends toward a respective longitudinal end of the bridge section.

Advantageously, each locking arm is formed as a flexible spring which is connected with the middle portion of the bridge section and which smoothly passes into a locking spring which, thus, is formed with the flexible spring as a one-piece element. The locking spring has a substantially V-shaped longitudinal cross-section and has a spring leg which forms the manually bendable latch. Forming the locking arm as one-piece resilient element provides for a simple and cost-effective manufacturing of the clamp. The locking arm is conveniently arranged in the bridge section and does not extend beyond the width of the bridge section.

The flexible spring preloads the locking elements of the clamp and increases its holding force. The substantially V-shaped locking spring is compressible transverse to the longitudinal extent of the cable duct and additionally increases the preload of the locking engagement of the locking hook with the locking nose.

Because the spring leg of the locking spring projects above the upper surface of the bridge section and is formed as a handle, it can be easily actuated by hand. The length of the handle is so selected that it, in a pre-assembled condition of the clamp, extends above the free end of the side wall of the cable duct. The handle becomes substantially aligned with the free end of the side wall when the locking hook of the latch lockingly engages the locking nose formed on the side wall edge.

By extending the handle above the side wall of the cable duct, it becomes possible to effect final fixing of the clamp simultaneously with closing of the duct with the cover. The handle abuts the bottom surface of the cover and, upon the cover being pressed downward, is moved downwardly until the locking hooks engage the locking noses on the bent-out portions of the side wall edges. This insures that the length of the handles does not extend beyond the side walls and, thus, does not interfere with mounting of the cover.

For releasing one side of the clamp, the handle is pushed against the biasing force of the locking spring in a direction toward the middle portion of the bridge section. The respective locking hook becomes disengaged from the locking nose. Because of the preload of the flexible spring, the locking arm pivots upward, and the locking element occupies its initial position.

Corresponding bevels of the locking hook and the locking nose facilitate their locking engagement. Pressure applied to the handle either by hand or by the mountable cover provides for sliding of the locking hook bevel along the locking nose bevel downwardly until the locking hook lockingly engages the locking nose. Both the flexible spring and the locking spring become preloaded and, as a result, the locking hook engages the locking nose from beneath. The preload of the flexible and locking spring provides a force component which pushes the locking nose, which is formed on the outer side of the bent-out portion of the side wall edge and extends longitudinally, upward. As a result, the bent-out portion of the edge pivots about an axis extending in the longitudinal direction of the duct, pulling the hook-shaped connection portion engaging into the anchoring groove undercut further in.

The resistance of the mounted clamp to an accidental displacement along the edges can be increased by increasing friction between the cooperating surfaces of the locking hook and the locking nose. The increase of friction can be achieved, e.g., by providing the cooperating surfaces with a fluted profile. As an alternative or in addition, the locking nose can be made of a softer material than the locking hook. In this case, in the locking condition, the hard, knife-like formed locking hook is biased, as a result of preloading of the flexible and locking springs, into the soft material of the locking nose, forming a formlocking connection which prevents release of the clamp. E.g., the locking hook(s) can be formed of a hard PVC, and the locking nose can be formed of a soft PVC.

In accordance with a preferred embodiment, the clamp is formed entirely of a plastic material by injection-molding or extrusion. When a softer material is used for forming the locking noses, a coextrusion process can be used.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
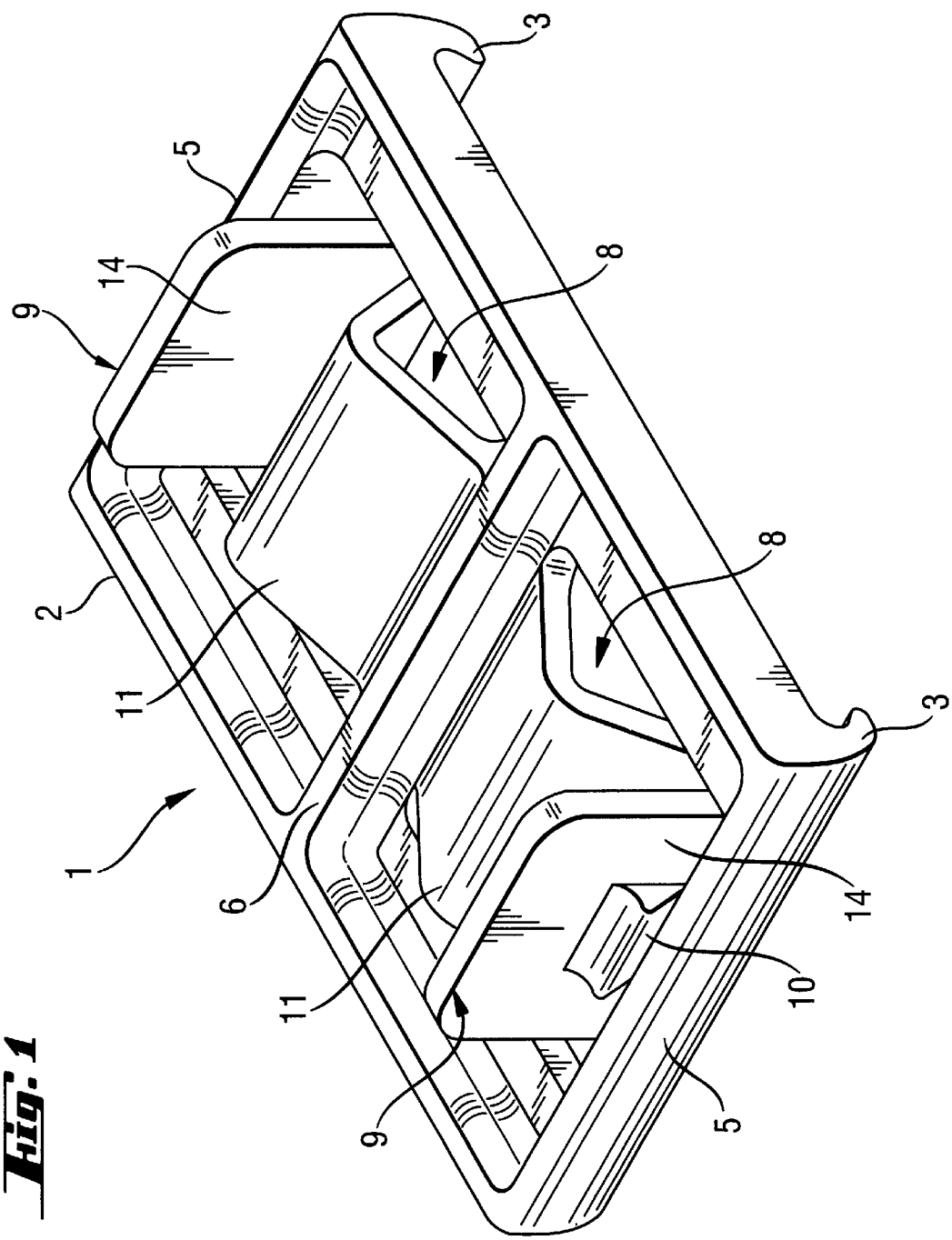
FIG. 1 shows a perspective view of a clamp for a cable duct according to the present invention.

A clamp for a cable duct according to the present invention, which is shown in FIG. 1, is generally designated with a reference numeral 1. The clamp 1 has a frame-shaped bridge section 2 with cavities 8. At the longitudinal ends 5 of the bridge section 2, there are provided hook-shaped connection portions 3. The hook-like shape of the connection portions 3 is achieved by bending the bridge section 2 at its longitudinal ends 5 inward so that the obtained hooks face each other. Two latches 9, which are formed each of a locking arm 11 provided with a fixing hook 10, project from opposite sides of a middle portion 6 of the bridge section 2. The latches 9 can be bent out in the longitudinal direction of the clamp 1. The latches 9 extend in the respective cavities 8 formed on opposite sides of the middle portion 6 of the bridge section 2. The locking arms 11 are submergible into the cavities 8.

Figure 2:
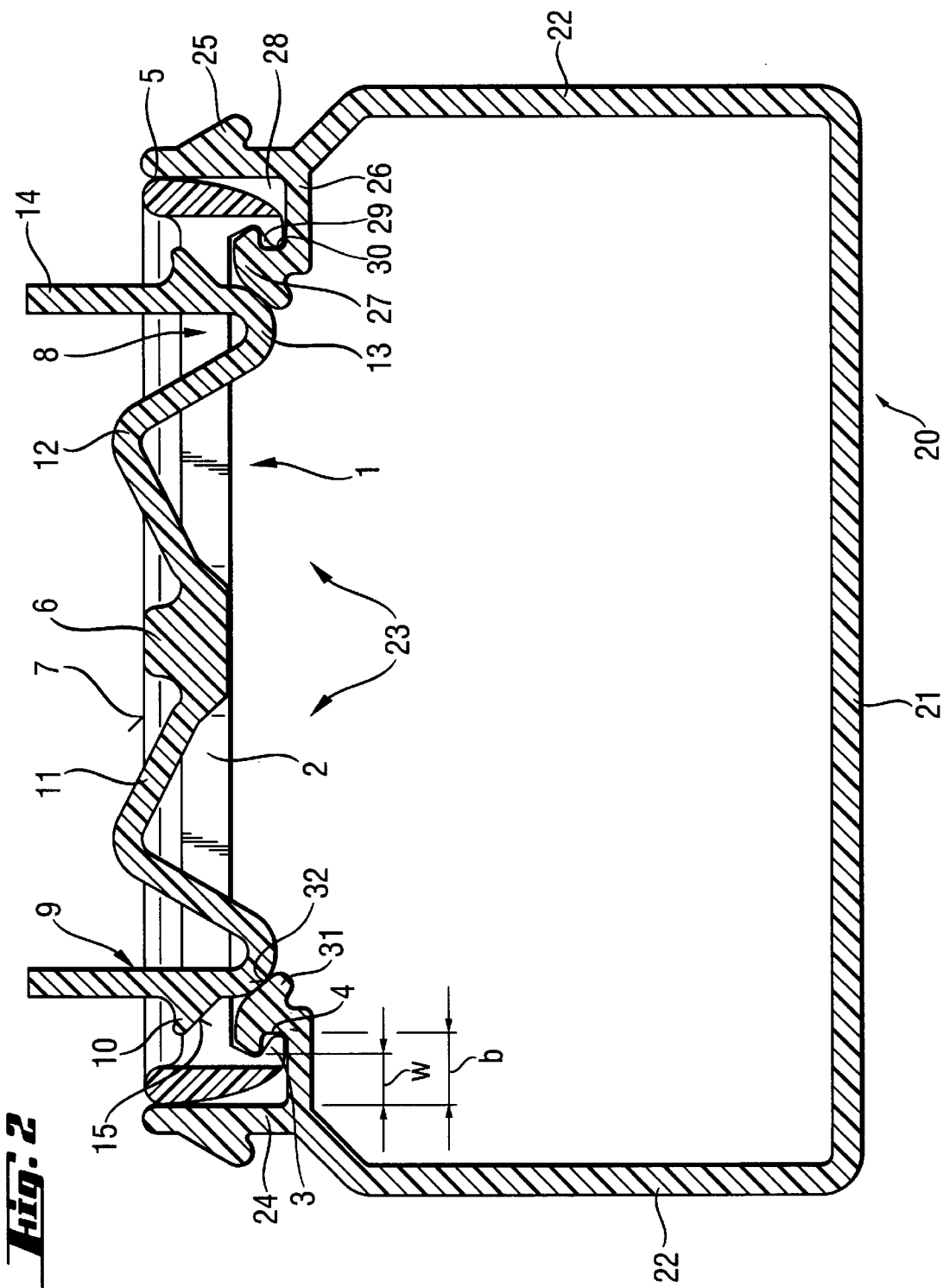
FIG. 2 shows a cross-sectional view of the pre-assembled clamp taken transverse to a longitudinal extent of a cable duct.

FIG. 2 shows the clamp 1 in its pre-mounted or pre-assembled position on the cable duct 20. The cable duct 20 has a bottom wall 21 connected at its opposite longitudinal ends with side walls 22. The manner in which the side walls 22 are connected with the bottom wall 21 is irrelevant for purposes of the present invention. For completeness sake, it can only be indicated that side walls 22 can be connected with the bottom wall 21 rigidly, foldably and/or releasably. The side walls 21 are somewhat inclined with respect to the bottom wall 22 and extend, e.g., about perpendicular to the bottom wall 21. The open side 23, which is located opposite the bottom wall 21, provides for placing of cables into the cable duct 20. In the region of free ends 24 of the side walls 22, strip-shaped edges 26 project from the respective side walls 22 inward. The strip-shaped edges 26 extend parallel to the longitudinal extent of the cable duct 20. A portion 27 of each strip-shaped edge 26 is bent out in a direction of the open side 23 of the cable duct 20. The bend-out edge portion 27 and the respective side wall 22 limit an anchoring groove 28 which extends parallel to the strip-shaped edge 26. In the transitional region between the bent-out edge portion 27 and the strip-shaped edge 26, the anchoring groove 28 has an undercut 29.

The clamp 1 is placed on the strip-shaped edges 26 from above and is pressed into the anchoring grooves 28. The hook-shaped connection portion 3 slides into the anchoring grooves 28 and become hooked in respective undercuts 29. The distance of the inward-facing hook stop 4 from the longitudinal end 5 of the clamp 1, which defines the hook width b, is larger than the width w of the anchoring groove 28 which is determined by the distance of the bent-out portion 27 of the edge 26 from the side wall 22 at the mouth of the anchoring groove 28. The distance of a stop 30 of the undercut 29 from the sidewall 22 at the bottom of the anchoring groove 28 corresponds substantially to the hook width b. As a result of the hooking of the hook-shaped connection portions 3 in the undercuts 29 of the anchoring grooves 28, the clamp 1 is preliminary fixed on the channel duct 20. Upon tensioning, e.g., by the weight of a cable during the overhead mounting, the hooked connections 3, 29 become latched even further, and the holding force of the clamp 1 increases. This prevents an accidental release of the clamp 1 from the edges of the cable duct 20.

On the other hand, the interlocking of the hooked-shaped connection portions 3 in the undercuts 29 of the anchoring grooves 28 can be easily released, if necessary, by grasping the clamp 1 at one of its longitudinal ends and pulling it out of the respective anchoring groove 28. When the clamp 1 is pulled upward in this manner, e.g., to place another cable into the cable duct 20, the hook-shaped connection portion 3 at the opposite longitudinal end 5 of the clamp 1 is pushed further into the undercut 29 of the opposite anchoring groove 28. The longitudinal end 5, in this case, is supported against the inner surface of the side wall 22 of the cable duct 20. The hooked connection becomes latched in the undercut 29 of the opposite groove 28 and forms a type of a hinge which permits the clamp 1 to be pulled upward at one end 5 while the opposite end 5 remains connected with the associated edge 26. The mounted clamp 1 provides for stiffening of the side walls 22 and insures a correct spacing of the side walls 22 from each other. This insures mounting of a cover on the cable duct with a necessary clamping force.

The clamp 1, which is pre-mounted on the cable duct 20 in this manner, is immovably fixed on the wall edges with locking means 9–11. Each locking arm 11 is formed of a flexible spring 12 which is secured to the middle portion 6 of the frame-shaped bridge section 2 and which is connected, preferably integrally, with a locking spring 13. The locking spring 13 has a V-shaped longitudinal cross-section and has a spring leg which forms, together with the locking hook 10, the latch 9. The locking hook 10 is designed for locking with a locking nose 31 that projects from an inward-facing side surface of the edge 26 and that extends along the edge 26. The free end of the spring leg 9 projects beyond the upper surface 7 of the clamp 1 and is used as a handle 14 by a user. The length of the handle 14 is so selected that in the pre-assembled position of the clamp 1, the handle 14 extends beyond the free end 24 of the side wall 22 of the cable duct 20 and, upon engagement of the locking hook 10 of the latch 9 with the locking nose 31 at a respective edge 26, it is arranged at the same level as the free end 24 of the side wall 22. A bevel 15 on the outer surface of the locking hook 10 and bevel 32 on the locking nose 31 facilitate locking of the locking elements of the clamp 1 with respective locking elements of the cable duct 20.

Figure 3:
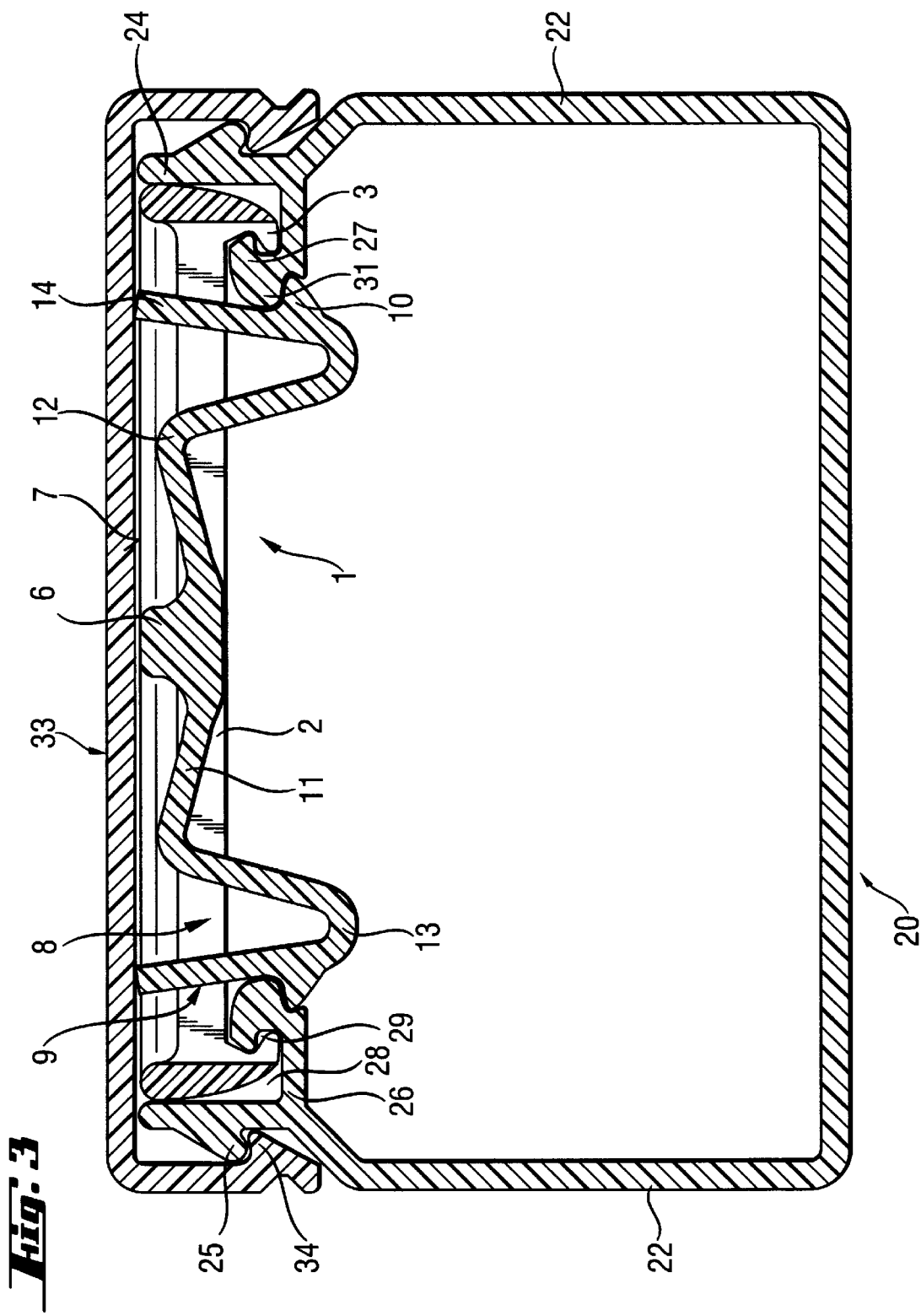
FIG. 3 shows a view similar to that of FIG. 2 but with the clamp being fixed in its position.

FIG. 3 shows the inventive clamp in its fixed position. The cable duct 20 is shown together with its cover 33. The locking elements 34 of the cover 33 engage in locking grooves 25 formed in outer surfaces of the free ends 24 of the side walls 22 of the cable duct 20. The handles 14, which in the pre-assembled position of the clamp 1, project beyond the upper surface 7 of the bridge section 2, are submerged manually or by the applied cover 33 into the cavities 8 of the frame-shaped bridge section 2. The locking hooks 10 of the latches 9 engage from beneath the locking noses 31 which project inward from the bent-out portion 27 of the edges 26 of the side walls 22. The surfaces of the locking hooks 10 and of the locking noses 31 can be formed as knurled surfaces. According to an alternative embodiment of the present invention, the locking noses can be formed of a softer material than locking hooks 10. E.g., the locking hooks can be formed of a hard PVC and the locking noses can be formed of a soft PVC. In the locking condition, the hard, knife-like formed, locking hooks are biased into the soft material of the locking noses 31 and formlocking connection which further contributes to preventing of an accidental release of the clamp 1.

The handles 14, after fixing of the clamp 1, do not project anymore over the side 7 of the clamp 1 and do not prevent mounting of the cover 33. The biasing actions of the flexible spring 12 and of locking spring 13 insure a preloaded locking engagement of the locking hooks 10 with the locking noses 31. The preload contributes to obtaining of a force component which pushes the locking noses 31, which extend in a longitudinal direction of the cable duct 20, upward. As a result, the end sections of the edges 26 pivot about an axis which extends in the longitudinal direction of the cable duct. 20, with the hook-shaped connection portions 3 of the clamp 1 being pulled further into the undercuts 29.

For releasing of one side of the clamp 1, the handle 14 of this side is pushed against the biasing force of the locking spring 13 in a direction toward the middle portion 6 of the bridge section 2, and the locking hook 10, at this side, becomes disengaged from the locking nose 31. As a result of preloading of the flexible spring 12, the locking arm 11 pivots upward, with the locking elements occupying their initial position. After the release of the locking connection, the clamp 1 can be lifted at one of its sides from the respective anchoring groove for placing another cable.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A clamp for a cable duct having, at an open side (23) thereof, in regions of free ends (24) of side walls (22) thereof, inward projecting, strip-shaped edges (26), the clamp comprising a bridge section (2) for bridging the open side (23) of a cable duct; and connection portions (3) provided at opposite longitudinal ends (5) of the bridge section (2) for engaging the stripe-shaped edges (26), the connection portions (3) being formed as inwardly bent, facing each other hooks lockingly engageable in undercuts (29) provided in respective anchoring grooves (28) extending in a longitudinal direction of the cable duct (20) and limited by respective bent-out portions (27) of respective said strip-shaped edges (26) of the side walls (22).

2. A clamp according to claim 1, wherein a distance (b) of a hook stop (4) of one of the connection portions (3) from an associated one of said longitudinal ends (5) of the bridge section (2) measured transverse to a longitudinal extent of the cable duct is larger than a width (w) of one of the respective anchoring groove (28) at a mouth of the one groove (28).

3. A clamp according to claim 1, wherein the bridge section (2) has at least one locking element including a latch (9) manually bendable outwardly transverse to said longitudinal direction of the cable duct (20) and including a locking hook (10) which, in a locking position of the clamp, lockingly engages a locking nose (31) extending in the longitudinal direction of the cable duct (20) and formed on an inwardly facing side of one of the bent-out portions (27) of one of the respective strip shaped edges (26).

4. A clamp according to claim 3, wherein the bridge section (2) is formed as a frame-shaped member provided with said at least one locking element includes two locking members each including a locking arm (11) elastically and springy connected to a middle portion (6) of the frame-shaped bridge section (2) and extending in a direction toward a respective one of the longitudinal ends (5) of the bridge section (2).

5. A clamp according to claim 4, wherein the locking arm (11) is formed of a flexible spring (12) and a locking spring (13) formed integrally with the flexible spring (12), the locking spring (13) having a substantially V-shaped longitudinal cross-section and a spring leg which forms the latch (9) with the locking hook (10).

6. A clamp according to claim 5, wherein the flexible spring has a leg formed as a handle (14) and having a length such that it projects above an upper surface (7) of the bridge section(2) and, in a preassembled condition of the clamp (1), extends above one of the free ends (24) of one of the side walls (22) of the cable duct (20), the handle (14) being substantially aligned with the one free end (24) of the one side wall (22) when the locking hook (10) of the latch (9) lockingly engages the locking nose (31) formed on the one respective strip shaped edges(26).

7. A clamp according to claim 3, wherein the locking hook (10) has a bevel (15) which slides along a bevel (32) formed on the locking nose (31).

8. A clamp according to claim 3, wherein at least one of cooperating surfaces of the locking hook (10) and the locking nose (31) is formed as a knurled surface.

9. A clamp according to claim 3, wherein the locking nose (31) is formed of a material which is softer than a material of which the locking hook is formed.

10. A clamp according to claim 1, wherein the clamp is formed entirely of a plastic material by one of injection-molding process and extrusion process.

* * * * *